United States Patent [19]

Miyawaki et al.

[11] Patent Number: 4,666,280
[45] Date of Patent: May 19, 1987

[54] FLASH SHOT CONTROL DEVICE FOR CAMERA

[75] Inventors: Makoto Miyawaki; Kazuo Ikawa, both of Kanagawa, Japan

[73] Assignee: Canon Kabushiki Kaisha, Tokyo, Japan

[21] Appl. No.: 843,736

[22] Filed: Mar. 25, 1986

[30] Foreign Application Priority Data

Mar. 26, 1985 [JP] Japan ................................. 60-61296

[51] Int. Cl.[4] ............................................. G03B 15/02
[52] U.S. Cl. ................................. 354/414; 354/149.1; 362/4; 362/18
[58] Field of Search .................... 354/414, 419, 127.1, 354/149.1; 362/4, 5, 16, 17, 18

[56] References Cited

U.S. PATENT DOCUMENTS 3,456,101  7/1969  Rentschler et al. .................... 362/4
3,538,825  11/1970  Taylor ............................. 362/18 X
3,667,357  6/1972  Matsuda ............................ 354/414
4,515,453  5/1985  Wakabayashi et al. .......... 354/149.1

Primary Examiner—W. B. Perkey
Attorney, Agent, or Firm—Toren, McGeady & Goldberg

[57] ABSTRACT

A flash shot control device for a camera in which the angle of flash lighting is controlled in accordance with the output of a backlight detector. On assumption that a subject of principal photographic interest takes its place at the center of the field of view, when backlight is detected, the flash lighting is concentrated to the central portion of the field of view, thereby the shadows of the subject are lightened by the flash.

6 Claims, 13 Drawing Figures

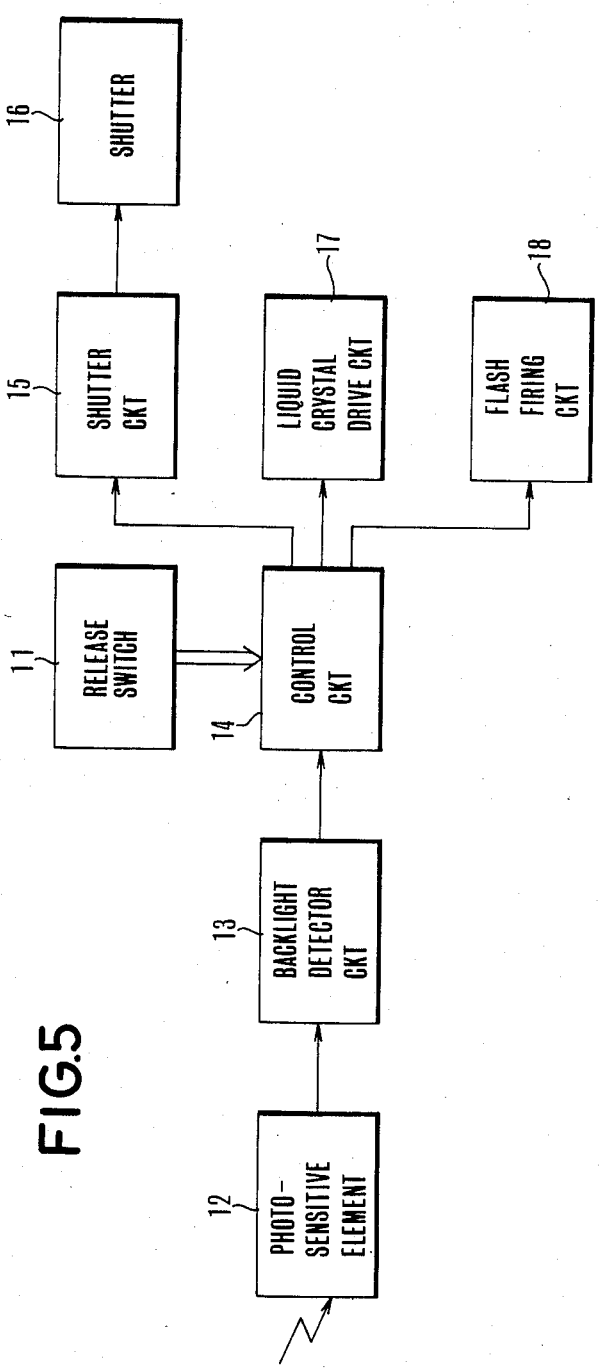

4,666,280

FLASH SHOT CONTROL DEVICE FOR CAMERA

BACKGROUND OF THE INVENTION

1. Field of the Invention

This invention relates to flash shot control devices for cameras, and more particularly to a device responsive to automatic detection of a backlight situation of a subject for firing a flash unit.

2. Description of the Prior Art

It has been known in the art to provide a camera having a flash unit with automatic means making it possible to fire the flash unit to fill shadows of a subject in response to detection of the fact that the subject is in backlight, thus preventing the subject from being underexposed, as, for example, proposed in U.S. Pat. No. 3,667,357.

In this case, because the background has a high brightness, the diaphragm must be stopped down. So, the guide number of the flash unit is necessarily somewhat unduly large. To come up with a compact camera whose flash lamp or unit has a small guide number, particularly when the shadows of the subject are very deep, there will be a high possibility of either failing to obtain a sufficient fill-in flash, or shortening the effective approach distance.

If a large increase of the guide number of the flash unit is attempted, however, it will result that an advance in the compactness of the camera is obstructed, or that, as it takes a long time to fully charge the storage capacitor, taking a series of flash shots is very time consuming. These drawbacks become very serious when a quick and easy management is aimed at.

SUMMARY OF THE INVENTION

With the foregoing in mind, the present invention has been made, and its first object is to provide a camera which enables the influence of backlight to be corrected by firing a flash unit in response to detection of the backlight.

On the premise that a subject of principal photographic interest takes its place at the center of the area of the viewfield, (as is valid in most of the photographic situations which may be really encountered) when the backlight condition is detected by detecting means, the illuminating light of the flash unit is concentrated to the center of the area of the viewfield by illumination angle varying means.

It is, therefore, a second object of the invention to provide a flash shot control device for a camera in which even with the flash unit of small capacitance and with the diaphragm at a small size of aperture opening, it is possible to sufficiently assure that the subject is prevented from being under-exposed.

Other objects of the invention will become apparent from the following description of embodiments thereof.

BRIEF DESCRIPTION OF THE DRAWINGS

FIG. 5 is a block diagram of an example of the construction of circuitry usable in the present invention.

DETAILED DESCRIPTION OF THE PREFERRED EMBODIMENTS

The present invention is next described in connection with embodiments thereof by reference to the drawings.

Figure 1:
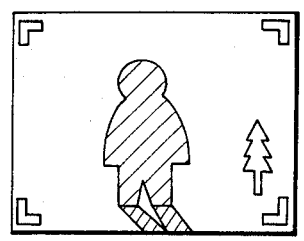
FIGS. 1 and 2 are pictorial representations of the field of view of a finder, with FIG. 1 in a case of no fill-in flash and FIG. 2 in another case when a flash shot is made under the control of the invention.
Figure 2:
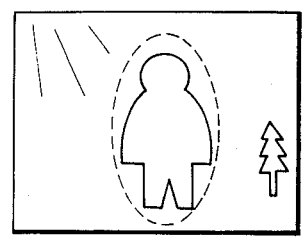

FIG. 1 illustrates a finder image of a backlight scene to which is applied the present invention, and FIG. 2 illustrates how an under-exposure of a person is saved by a flash illumination with the flash device, when the finder image of the person lies at the center of the area of the picture frame.

Figure 3A:
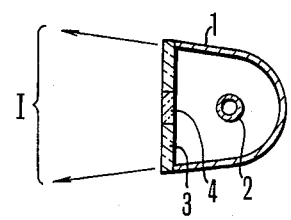
FIGS. 3A and 3B are respectively a side sectional view and a front view of a firing portion of the flash unit along with how to control the illumination angle when shooting in backlight.
Figure 3B:
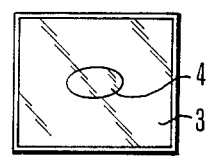
Figure 4A:
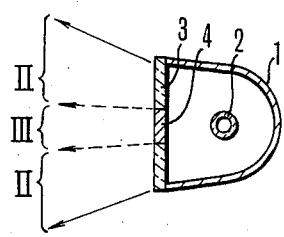
FIGS. 4A and 4B are similar to FIGS. 3A and 3B except that a flash shot with plain or front light is illustrated.
Figure 4B:
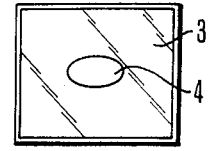

FIGS. 3A and 4A are sectional views of the flash lamp and reflector of an embodiment of a flash shot control device according to the invention. FIGS. 3B and 4B are front elevational views of the window of the reflector.

In FIGS. 3A, 3B, 4A and 4B, a reflector 1 contains a light source 2 such as a xenon tube or the like, and is covered by a front glass plate or window 3. A central portion 4 of the window 3 is cut out to an oval shape and filled with material optical means in the form of a liquid crystal (for example, of the nematic type) cell. When a voltage is applied across the cell 4, it becomes transparent. When in the normal state (with no voltage applied), it functions as a diffusing plate. FIGS. 3A and 3B illustrate a position with application of the voltage, and FIGS. 4A and 4B illustrate another or inoperative position with application of no voltage.

The reflector 1 is so designed that rays of light issuing from the light source 2 are collimated to a central portion of the field of view, for the guide number of the central portion of the field angle gets increased.

FIG. 5 illustrates the circuitry of a camera employing the above-described liquid crystal cell 4. A drive circuit 17 for the liquid crystal cell 4 is of known construction and is arranged to apply a voltage across the liquid crystal cell 4 when a release switch 11 is thrown and when a backlight detector circuit 13 produces an output signal representing the presence of backlight.

Figure 6:
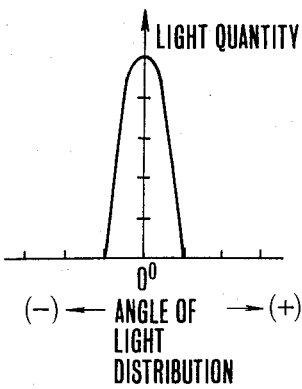
FIGS. 6 and 7 are flash intensity distribution curves of the flash unit in the positions of FIGS. 3A, 3B and 4A, 4B respectively.

In operating the camera, for the subject under a backlight condition, responsive to closure of the release switch 11, the prior known backlight detector circuit 13 operates with the result that the lighting situation is determined as backlight based on the ambient light incident on a photosensitive element 12, producing a signal representing the detection of that backlight situation. Responsive to this signal, a control circuit 14 produces an actuating signal which is then applied to the drive circuit 17. Thereby the drive circuit 17 applies a voltage on the liquid crystal cell 4. Therefore, the liquid crystal cell 4 becomes transparent as shown in FIGS. 3A and 3B. At the same time, a prior known shutter circuit 15 opens a shutter 16, and a prior known flash firing circuit 18 causes the light source 2 to emit intense light. The light from the light source 2 is concentrated and directed to the central portion of the viewfield by the reflector 1. In other words, a light bundle I of so narrow angle that the guide number of the central portion of the viewfield is high, and the guide number of the environment is low is projected into the object space. Therefore, a light intensity distribution as shown in FIG. 6 is obtained. So, the shadows of the subject of principal photographic interest are properly lightened. Thus, the adverse effect of backlight is corrected.

Figure 7:
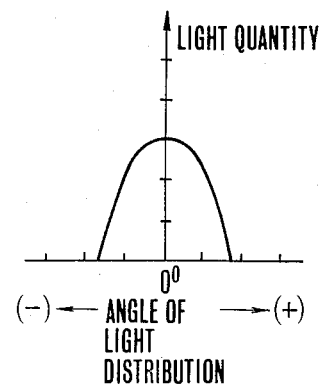
Figure 8A:
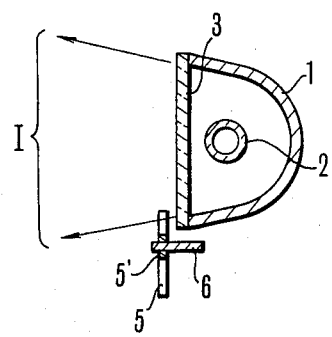
FIGS. 8A and 8B and FIGS. 9A and 9B illustrate another embodiment of the invention in which an illumination angle changing mechanism assumes inoperative and operative positions respectively.
Figure 8B:
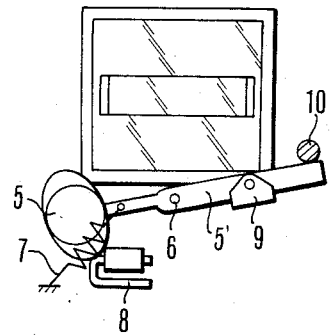
Figure 9A:
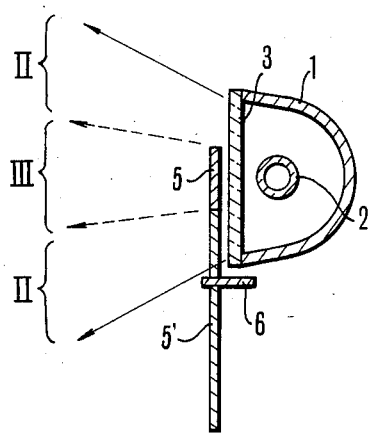
Figure 9B:
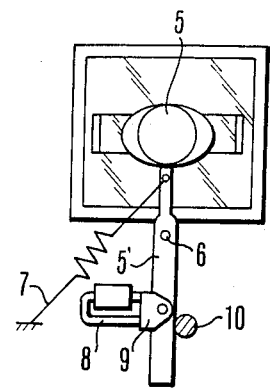

In case the backlight detector circuit 13 produces no output signal, as the lighting situation is front light, on the other hand, the control circuit 14 does not produce the actuating signal. Therefore, the liquid crystal cell 4 does not become transparent, functioning as the diffusion plate. Thereby, it is made possible to take a good flash shot even in such a situation that ambient light is so dark over the entire field of view that the flash unit is necessary to fire, for only that part of the light issued from the light source 2, or the total sum of the light coming directly from the light source 2 and the light reflected from the reflector 1, which passes through the central portion 4 is diffused, or only the central beam III becomes more divergent, although the surrounding beam II is left unchanged in the angle of divergence. Because the central beam III diverging in all directions superimposes on the surrounding beam II, the flash light intensity distribution curve is made more flat as shown in FIG. 7 than when in blacklight situation. This means that an almost uniform flash illumination is given to the field of view as a whole.

Another embodiment of the invention is shown in FIGS. 8A, 8B and 9A, 9B where the same reference numerals have been employed to denote the similar parts to those shown in FIGS. 3A, 3B and 4A, 4B.

The reflector 1, in this instance, is so designed from the very beginning that the flash shot is effective in the central part of the field of view of the photographic lens. A diffusing plate 5 is fixedly carried on one end of a lever 5' pivotally mounted about a pin 6. A return spring 7 urges the lever 5' in a counterclockwise direction. A magnet of PM type that when supplied with current, loses magnetic force is arranged to cooperate with an armature 9 on the opposite end of the lever 5'. A charging member 10 in cooperation with a charing system (not shown) for the shutter turns the lever 5' in a clockwise direction until the unenergized magnet 8 can hold the armature 9, each time the shutter is released.

The operation is as follows: With the camera in the charged position, the diffusing plate 5 is held in front of the xenon tube 2 in the reflector 1 (see FIGS. 9A and 9B).

If the photographic situation is not backlight, or, it is evening, indoor, or the like, pointing the camera to the subject does not activate the backlight detector circuit 13. So, leaving the diffusion plate 5 in the operative position, actuation of a camera release triggers the firing circuit 18 for the flash tube 2. At this time, the light beam III only is diffused with a decrease in the degree of concentration of the flash lighting to the central portion. Thus, the diffusion of the beam III into the beam II allows the field of view of the photographic lens to be illuminated uniformly.

Next, if the subject is in backlight, the alignment of the camera to the subject causes the backlight detector circuit 13 to produce an actuating signal for the magnet 8. When the release signal appears, the actuating signal renders the magnet drive circuit operative. As the magnet 8 is energized to free the armature 9, the lever 5' then turns under the action of the spring 7, thereby the diffusing plate 5 is retracted from the path of flash light from the window 3 (see FIGS. 8A and 8B).

At the same time, the shutter 16 is opened. Then, the flash tube 2 is fired. The light from the flash tube 2 is concentrated as the beam I by the reflector 1 to the central portion of the field of view of the photographic lens. Therefore, such a photograph as shown in FIG. 2 can be taken.

Even in this second embodiment, the circuit of FIG. 5 may be employed with such a modification that the liquid crystal drive circuit 17 is replaced by a magnet drive circuit.

As has been described above, according to the present invention, on the premise that the subject of principal photographic interest exists with its image at the center of the area of the picture frame, the shooting angle of the flash unit is made variable depending on the output of the backlight detector. Upon detection of a backlight situation, the flash lighting is concentrated to sufficiently correct the backlight effect. The use of the flash shot control device of the invention even in the compact camera whose built-in flash unit is of small capacitance provides preservation of its compact form and the quick-charging capability, while nevertheless permitting introduction of an additional capability that when in backlight situations, the deep shadows of the subject can be sufficiently softened, as the intensity of flash light to the subject is increased. This gives a great advantage to flash photography of compact cameras.

What is claimed is:

1. A flash shot control device for a camera, comprising:
    (a) detecting means for detecting a backlight situation;
    (b) means for varying the degree of concentration of light from a flash unit; and
    (c) control means responsive to detection of the backlight situation by said detecting means for controlling said concentration varying means so as to increase the degree of concentration.

2. A device according to claim 1, wherein said concentration varying means includes material optical means.

3. A device according to claim 2, wherein said material optical means includes a liquid crystal diffusing plate.

4. A device according to claim 1, wherein said concentration varying means includes movable optical means.

5. A device according to claim 4, wherein said movable optical means includes a diffusion plate.

6. A device according to claim 1, wherein said concentration varying means is constructed so as to concentrate the light from said flash unit to the center of the viewfield of a photographic lens of said camera.

* * * * *